July 15, 1958 — W. F. BENNETT — 2,842,822
COLLAPSIBLE UTILITY HOOK
Filed Oct. 10, 1955
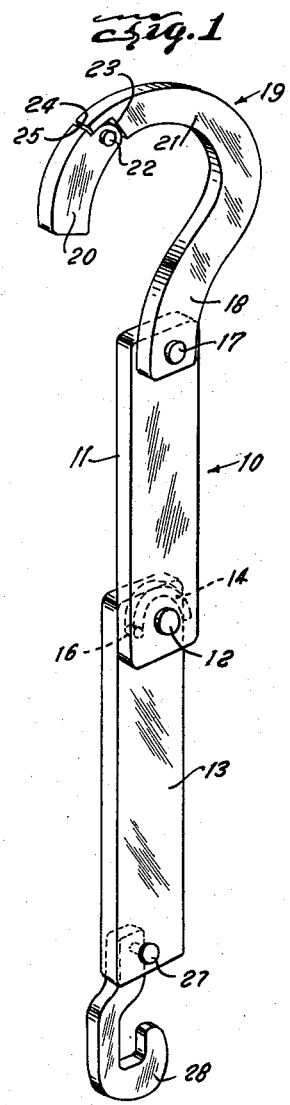
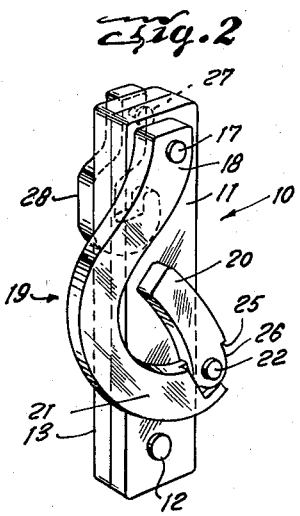
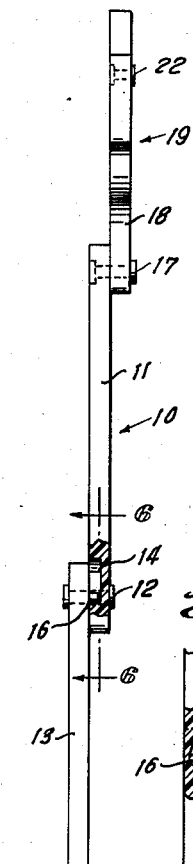
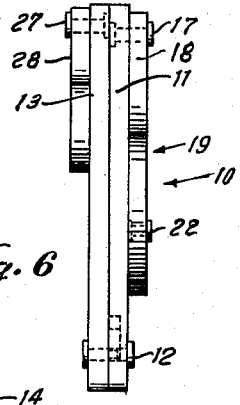
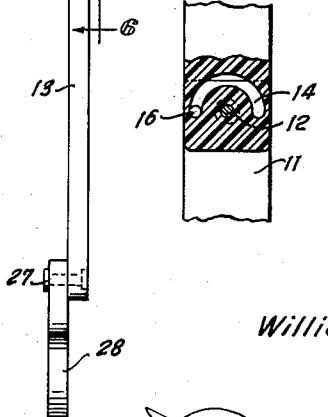
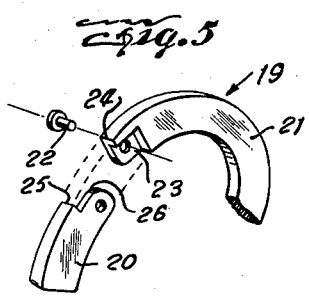
William F. Bennett
INVENTOR
ATTORNEY

United States Patent Office 2,842,822
Patented July 15, 1958

2,842,822
COLLAPSIBLE UTILITY HOOK
William F. Bennett, Grapevine, Tex.
Application October 10, 1955, Serial No. 539,507
9 Claims. (Cl. 24—73)

The invention relates to hooks and more particularly to collapsible, all purpose hooks.

The principal object of the invention is to provide a body composed of an articulated link assembly incorporating a pair of hooks, one on each end of the link assembly which are likewise composed of relatively pivoted sections, the whole being collapsible from fully extended position into a compact body which is but a fraction of the extended length of the body, thus to materially reduce the space occupied thereby in carrying or at its point of suspension on a wall or other locations.

Another object of the invention is to provide means adjacent the pivotal connection between the links composing the body of the device for restricting relative displacement of the links beyond predetermined limits.

With the foregoing in view, reference is made to the annexed drawing wherein:

Figure 1 is a perspective view of an article suspension element constructed according to the invention.

Figure 2 is a perspective view of the invention in collapsed or folded position.

Figure 3 is an elevational view of one edge of the invention in extended position.

Figure 4 is a view similar to Figure 3 but showing the invention collapsed.

Figure 5 is a fragmentary perspective view showing details of one of the foldable hooks, and Figure 6 is a fragmentary sectional view taken on line 6—6 of Figure 3.

Continuing with a more detailed description of the drawing, reference numeral 10 denotes generally the article suspension element or devise as a whole. The device may be made of any material suited to the use to which the same may be put and it consists primarily of a flat link 11, to one end of which is connected, by means of a pivot pin 12, a companion link 13.

The first mentioned link 11 is provided with an arcuate slot 14 in the face thereof confronting the link 13 and which slot lies above the pivot pin 12. This arcuate slot is adapted to receive a stud 16 affixed to and extending outwardly from the link 13 a distance substantially equal to the depth of the slot 14.

Attached to the opposite end of the first link 11 by means of a pivot pin 17 is the lower end of the shank 18 of a hook broadly indicated by reference numeral 19. The hook 19 is made in two pivotally related sections, one section constituting the shank 18 while the companion section 20 is joined to the curved portion 21 of the shank section 18 by means of a pivot pin 22.

To limit outward swinging displacement of the section 20 of the hook 19 beyond a predetermined point, the end of the hook is recessed at 23 (Figure 5) to a depth equal to half its thickness and to define a shoulder 24 against which abuts a shoulder 25 formed on the section 20 of the hook when the hook sections are extended, the section 20 being also recessed as at 26 to a depth equal to half its thickness so that the sides of the section 20 and the curved portion 21 of the hook will be on the same plane, enabling the hook 19 to lie flush against the side of the link 11 when in folded position.

Attached by means of a pivot pin 27 to the lower end of the link 13 is a smaller hook 28. This hook is adapted to fold upwardly and lie flush against the side of the link 13.

In extended position of its pivoted parts, the article suspending device described is adapted to be hung on a nail driven into a wall or from a rod by means of the large hook 19 while articles are suspended from the smaller hook 28. When the device is not in use, the small hook 28 is rotated about its pivot 27 into parallelism with the link 13 and the link 13 is swung about its pivot 12 into parallelism with the companion link 11, the pivot pin 12 being shifted from one end of the arcuate slot 14 to the opposite end thereof in the process. The short end section 20 of the hook 19 is swung inwardly on its pivot 22 toward the shank portion 18 or into the position shown in Figures 2 and 4 and the hook 19 is swung about the pivot pin 17 into a plane parallel with the link 11.

It is evident from the foregoing that when the parts of the suspension device are all in the folded position shown, the device occupies but a fraction of the space it would take up in fully extended positions of its parts.

Manifestly, the construction as shown and described is capable of some modification and such modification as may be construed to fall within the scope and meaning of the appended claims is also considered to be within the spirit and intent of the invention.

What is claimed is:

1. As a new article of manufacture, an article suspending device comprising a pair of substantially flat, elongate links, a pin pivotally joining adjacent ends of said links together for foldability of said links into relative parallelism, one of said links having an arcuate slot in one face thereof above said pin, a stud carried by the other of said links adapted to move in said arcuate slot from end to end thereof in folding and unfolding movements of said links to restrict their pivotal displacement beyond predetermined limits, a first hook carried by the opposite end of said one of said links composed of relatively pivoted sections and a second hook pivoted to the opposite end of said other of said links, said links and said hooks being rotatable about their individual pivots into relative parallelism.

2. As a new article of manufacture, an article suspending device comprising a pair of substantially flat, elongate links, a pin pivotally joining adjacent ends of said links together for foldability of said links into relative parallelism, a first hook carried by the opposite end of said one of said links composed of relatively pivoted sections and a second hook pivoted to the opposite end of said other of said links, said links and said hooks being rotatable about their individual pivots into relative parallelism, and means adjacent the pin joining said links for restricting their relative pivotal displacement beyond predetermined limits.

3. As a new article of manufacture, an article suspending device comprising a first link, a second link pivoted at one end to the adjacent end of said first link for rotation into parallelism therewith, a first hook composed of a shank pivoted at one end to the opposite end of said first link and having a curved section and an end section pivoted to said curved section, a second hook pivoted to the opposite end of said second link, said hooks and links being foldable into relative parallelism and means adjacent the pivotal connection between said links for restricting relative displacement thereof in folded and unfolded positions beyond predetermined limits.

4. The structure of claim 3, wherein the movement restricting means for said links is comprised of a pin protruding from one of said links adjacent one edge thereof and slidably received in an arcuate slot in the other of said links disposed above the pivotal connection between said links.

5. As a new article of manufacture, an article suspending device comprising a first link, a second link pivoted at one end to the adjacent end of said first link for rotation into parallelism therewith, a first hook pivoted at one end to the opposite end of said first link, a second hook pivoted to the opposite end of said second link, said hooks and links being foldable into relative parallelism and means adjacent the pivotal connection between said links for restricting relative displacement thereof in folded and unfolded positions beyond predetermined limits.

6. In a folding hook, the combination of a pair of substantially flat, elongated links, a pin pivotally connecting adjacent ends of the links whereby they are capable of being folded one upon the other, one of the links having an arcuate slot in one face thereof, above the pin, for engagement by a stud carried by the other link to thereby limit pivotal movement of the links relative to each other, a first hook pivotally connected to the opposite end of one of the links and composed of relatively pivoted sections, and a second hook pivotally connected to the opposite end of the other link, the links and the hooks lying in parallel planes and being rotatable about their respective pivots whereby they are capable of being folded in side by side relation to each other.

7. In a folding hook, the combination of a pair of substantially flat, elongated links, a pin pivotally connecting adjacent ends of the links whereby they are capable of being folded one upon the other, a first hook pivotally connected to the opposite end of one of the links, and a second hook pivotally connected to the opposite end of the other link, the links and the hooks lying in parallel planes and being rotatable about their respective pivots whereby they are capable of being folded in side by side relation to each other.

8. A folding hook as described in claim 7 in which one of the hooks is composed of relatively pivoted sections.

9. A folding hook as described in claim 7 in which one of the links has an arcuate slot in one face thereof, above the pin, for engagement by a stud carried by the other link to thereby limit pivotal movement of the links relative to each other.

References Cited in the file of this patent

UNITED STATES PATENTS

| 131,407 | Paeckert | Sept. 17, 1872 |
| 253,737 | McDonald | Feb. 14, 1882 |
| 2,500,471 | Schmiedt | Mar. 14, 1950 |